March 17, 1964 R. E. RICHARDSON 3,125,430
GLASS TEMPERING METHOD AND APPARATUS
Filed April 8, 1959 18 Sheets-Sheet 1

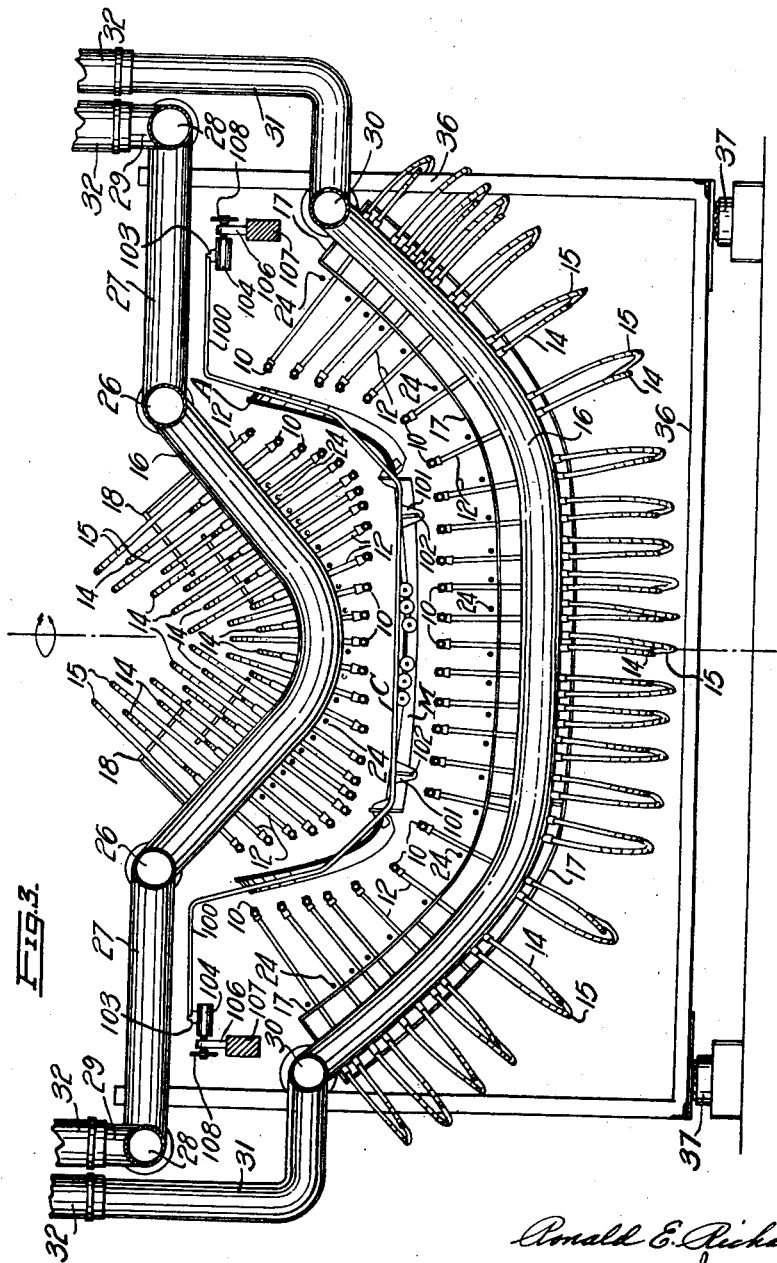

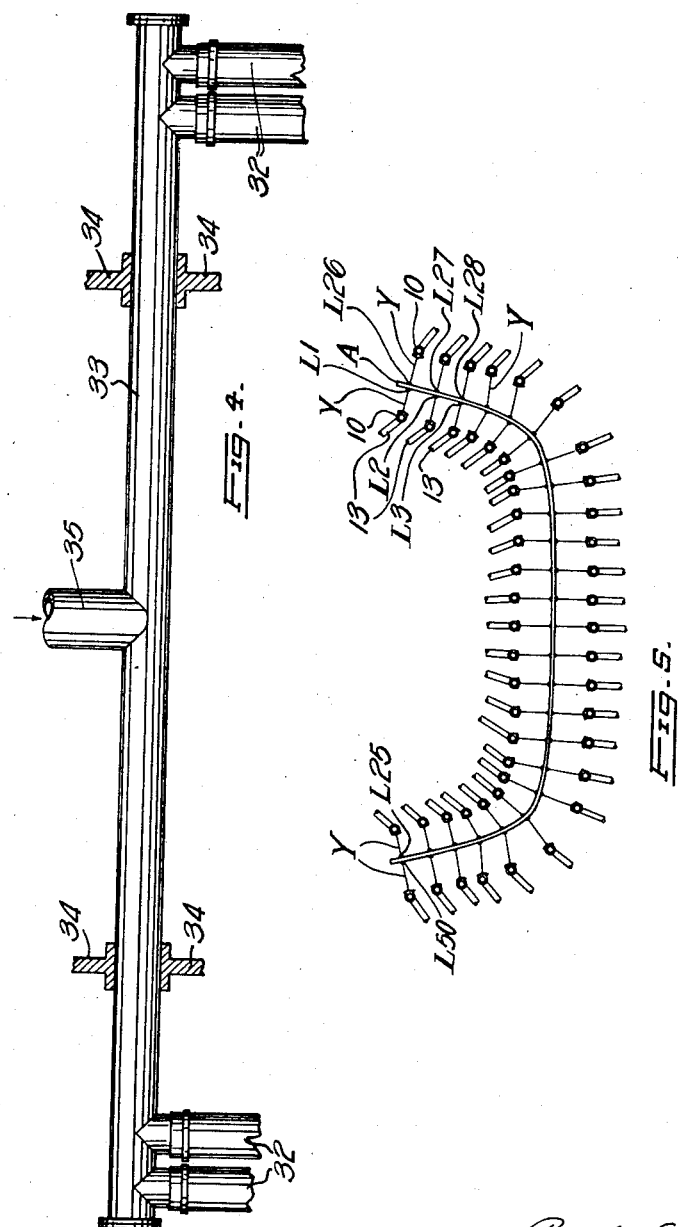

March 17, 1964  R. E. RICHARDSON  3,125,430
GLASS TEMPERING METHOD AND APPARATUS
Filed April 8, 1959  18 Sheets-Sheet 6
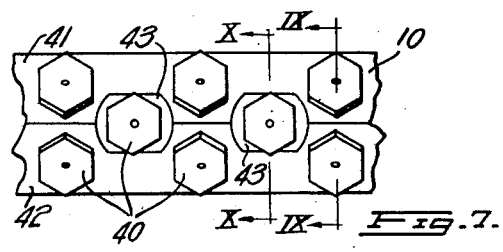
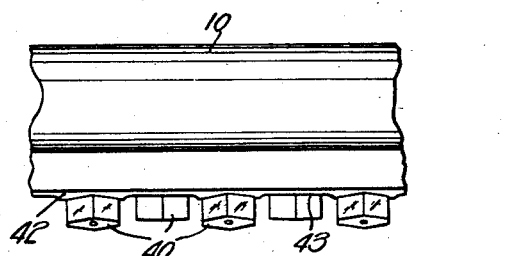
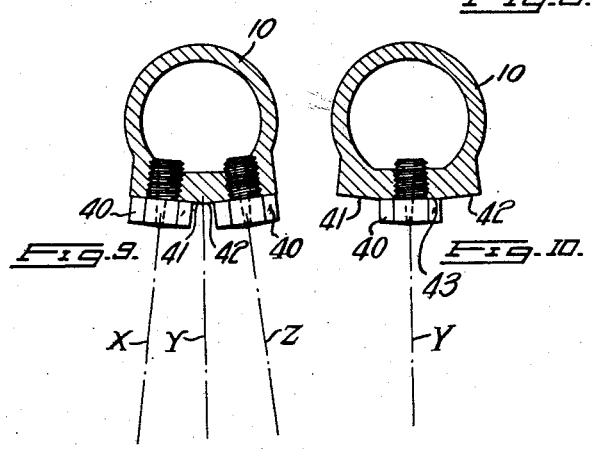

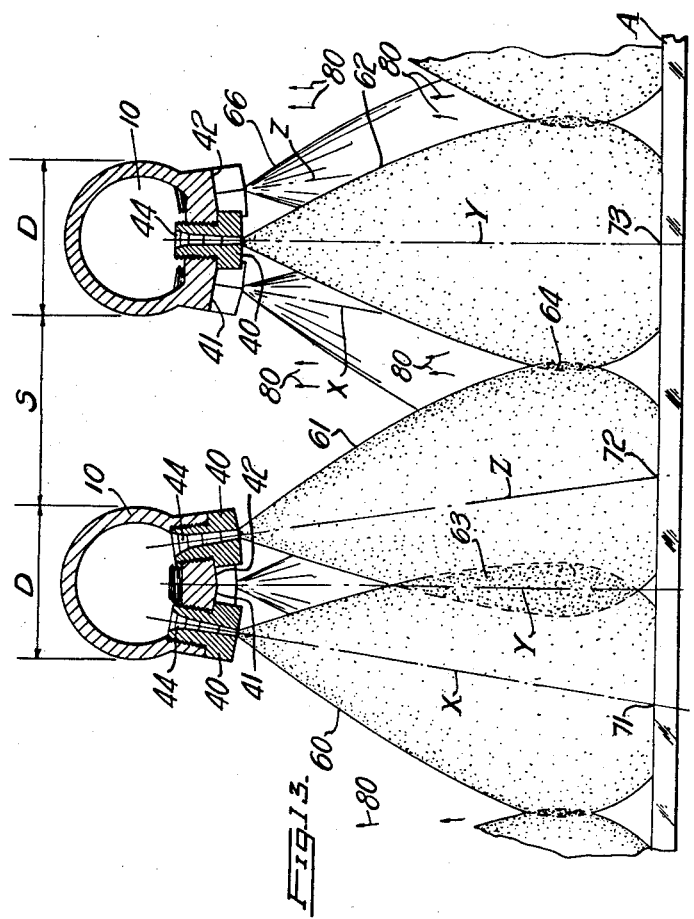

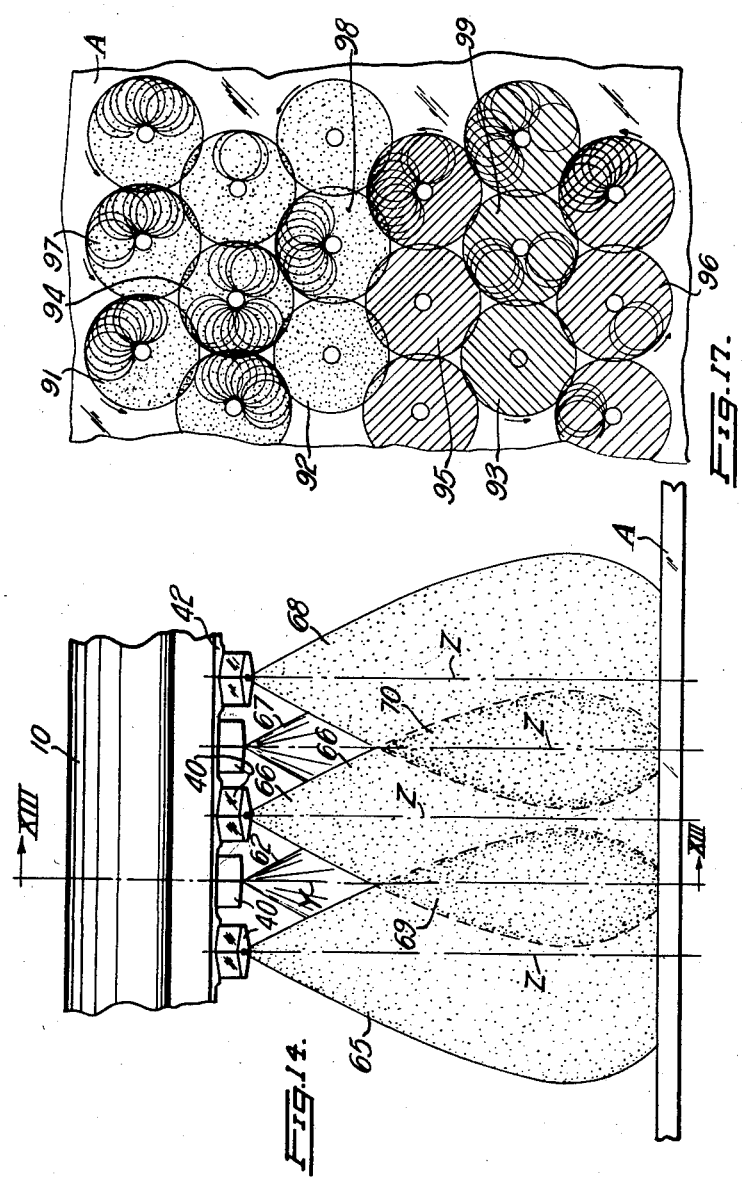

March 17, 1964 R. E. RICHARDSON 3,125,430
GLASS TEMPERING METHOD AND APPARATUS
Filed April 8, 1959 18 Sheets-Sheet 11
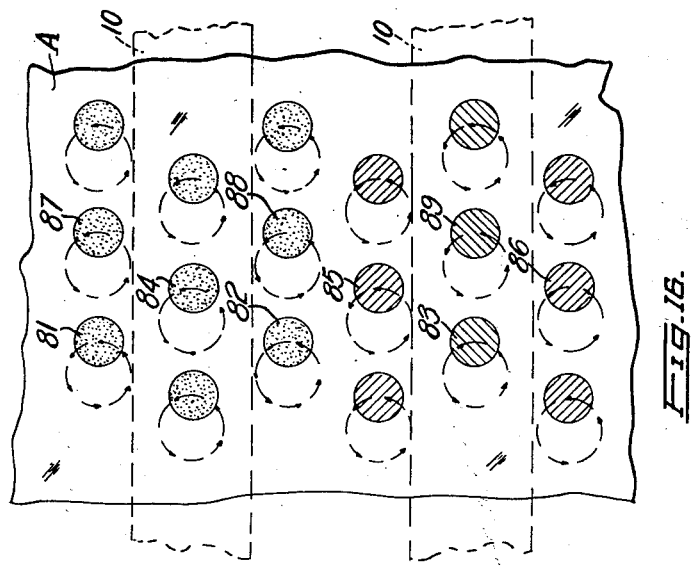
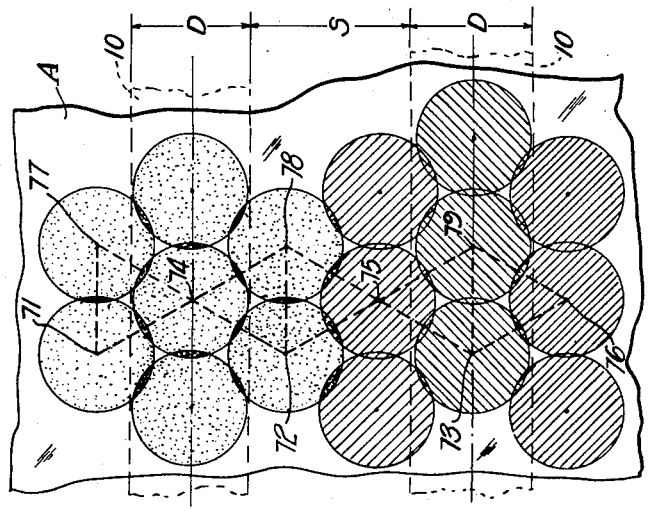
Ronald E. Richardson
Inventor
By Cushman, Darby & Cushman
Attorneys

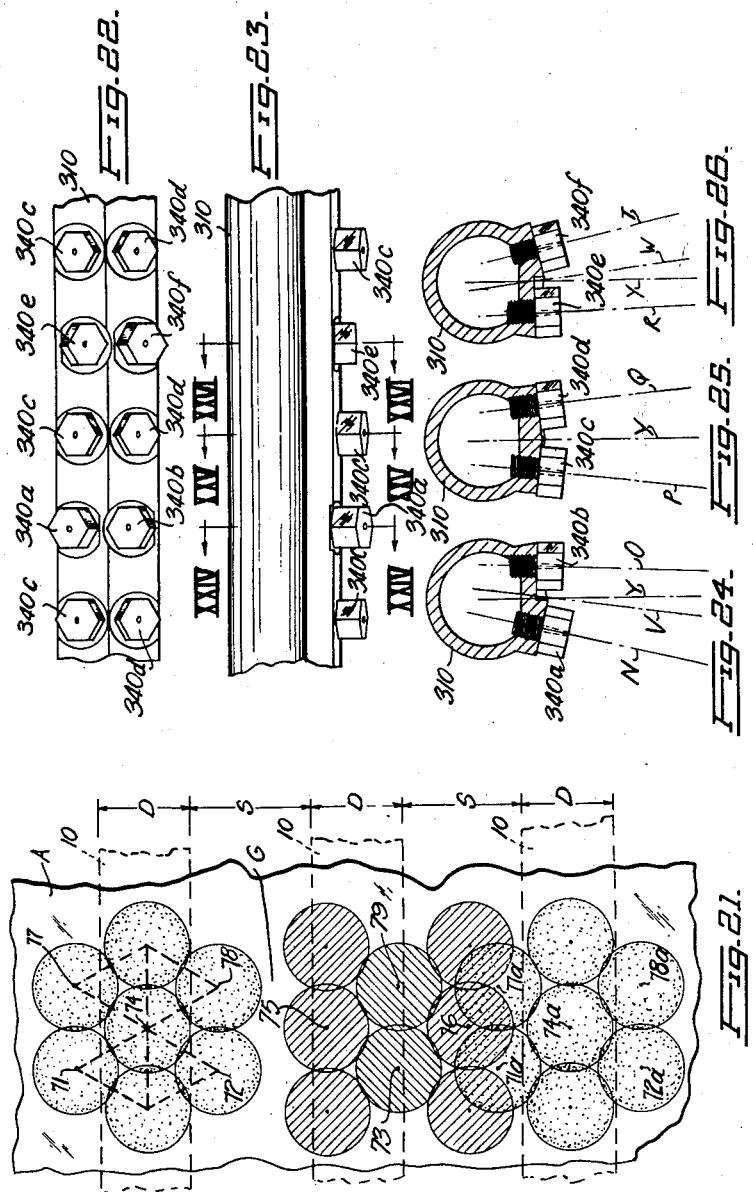

March 17, 1964 R. E. RICHARDSON 3,125,430
GLASS TEMPERING METHOD AND APPARATUS
Filed April 8, 1959 18 Sheets-Sheet 14
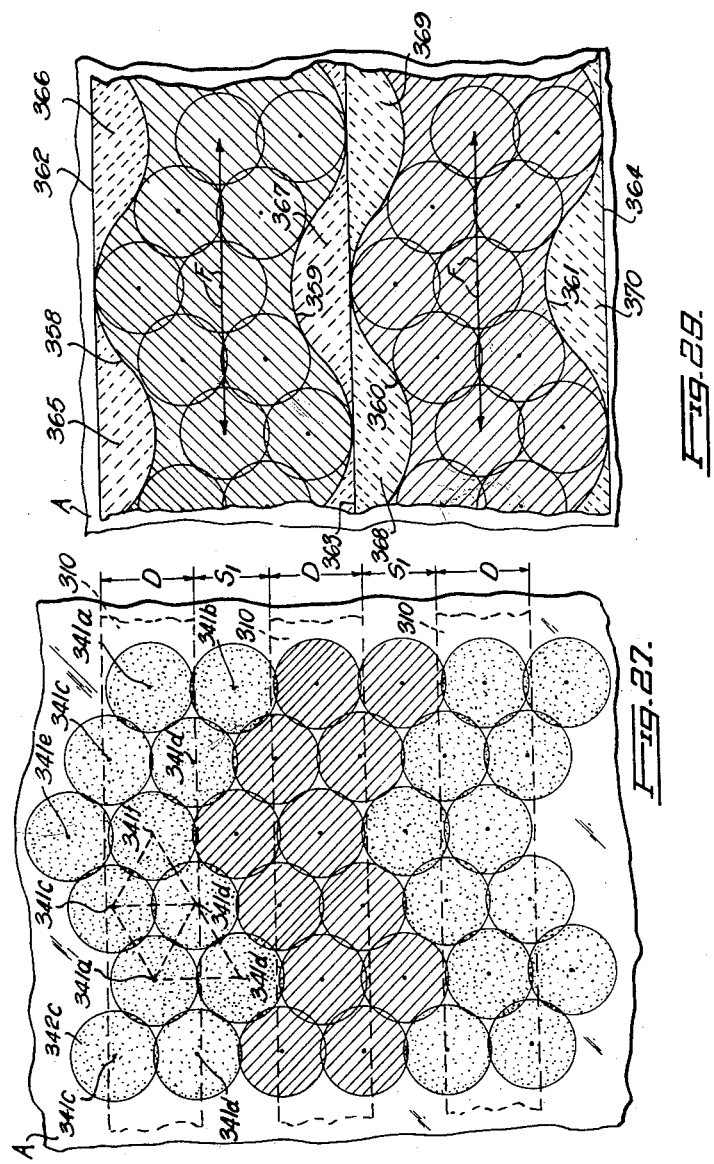

March 17, 1964   R. E. RICHARDSON   3,125,430
GLASS TEMPERING METHOD AND APPARATUS
Filed April 8, 1959   18 Sheets-Sheet 15
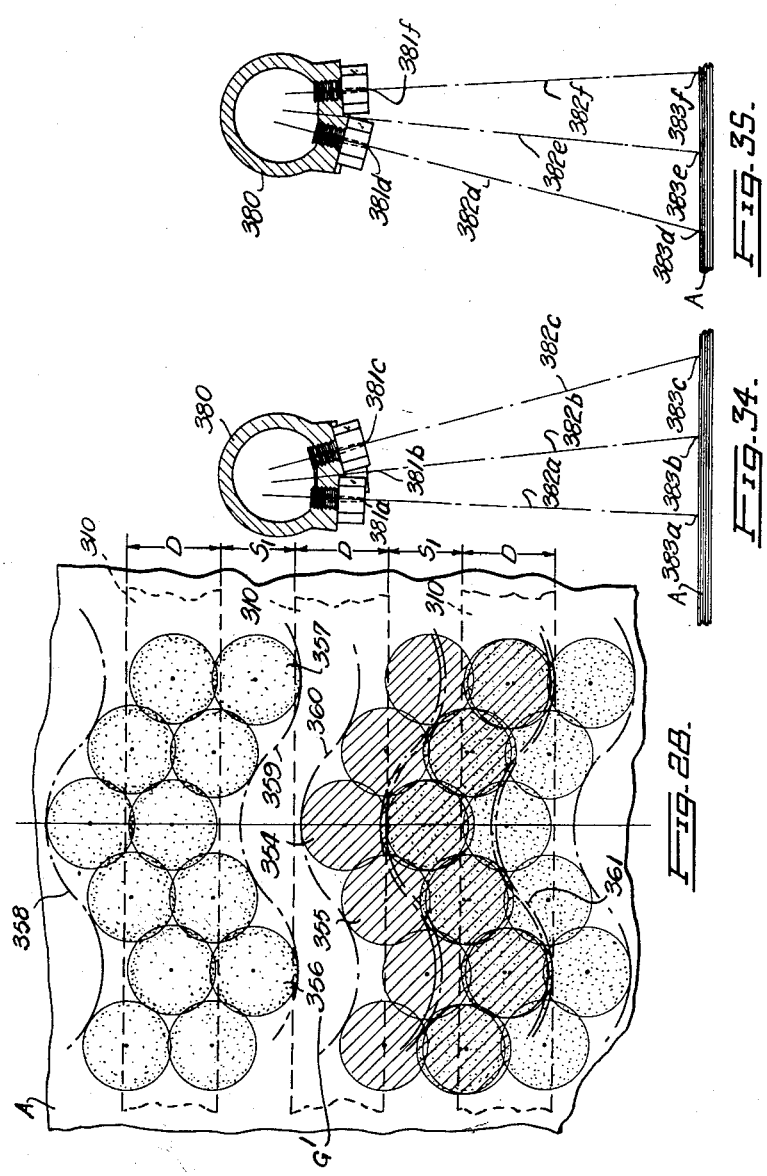

March 17, 1964 R. E. RICHARDSON 3,125,430
GLASS TEMPERING METHOD AND APPARATUS
Filed April 8, 1959 18 Sheets-Sheet 18

Ronald E. Richardson
Inventor
By Cushman, Darby & Cushman
Attorneys

United States Patent Office 3,125,430
Patented Mar. 17, 1964

3,125,430
GLASS TEMPERING METHOD AND APPARATUS
Ronald E. Richardson, Oshawa, Ontario, Canada, assignor to Pittsburgh Plate Glass Company, Pittsburgh, Pa.
Filed Apr. 8, 1959, Ser. No. 804,943
Claims priority, application Canada Oct. 8, 1958
20 Claims. (Cl. 65—114)

This invention relates to improvements in glass tempering methods and apparatus for use in the manufacture of tempered safety glass. This application is a continuation-in-part of application Serial No. 592,112, filed June 18, 1956, and of application Serial No. 713,739, filed February 6, 1958, now Patent No. 3,024,572.

Such treatment involves the heating of each glass sheet individually in a furnace, with subsequent rapid cooling effected by the application of a large number of small jets of cold air that are caused to play on the surfaces of the glass. In known machines for carrying out this treatment, the glass sheet may be held either vertically or horizontally, after being withdrawn from the furnace, and in either case will be positioned between a pair of blowing frames each of which includes a large number of closely spaced, generally parallel air nozzles. These frames are mounted so that jets of air issuing from the nozzles strike each of the two surfaces of the glass sheet substantially normally to the plane of the surface. The spacing between the nozzles of each frame and the adjacent glass surface is usually of the order of a few inches, say 6 inches.

The object of the present invention is to provide improvements in glass tempering apparatus of this type, and in particular to provide improved blowing frames.

More specifically, it is an object of the invention to provide a blowing frame in which the passageways forming the nozzles are so arranged as to cause the air streams issuing therefrom to impinge on the adjacent glass surface in a pattern substantially uniformly distributed over such surface.

To obtain satisfactory tempering, it is important to provide for ready escape of the heated air that has very recently been in contact with the hot glass surface. If this air cannot escape rapidly, the new cold air issuing from the nozzles does not come into adequate cooling contact with the glass surface, since the warm air that cannot escape tends to form a cushion protecting such surface. This condition is known as "snuffing."

It is an object of the invention to minimize snuffing by providing improved facilities for escape of warm spent air, and to accomplish this object without producing deleterious effects on the tempering operation itself, or the quality of the glass tempered on the apparatus.

The nozzles on a blowing frame must be comparatively close together, if they are to provide for complete coverage of the glass surface, from which it follows that there can only be a limited amount of space between nozzles for escape of the spent air. The present invention provides a structure in which the jets of cold air are maintained comparatively close together for good coverage of the glass surface, while at the same time improved facilities are provided for the escape of warm spent air.

In my prior patent application Serial No. 592,112, filed June 18, 1956, of which this application is a continuation-in-part, the manner in which the "throw" of air jets issuing from glass blowing frames may be increased by causing a degree of overlap between adjacent jets, is described. This latter earlier application also discloses the advantageous feature of bunching the nozzles together, so that the individual jets diverge from one another. By this expedient, it is found that a closer spacing of nozzles, i.e. more nozzles per unit area of frame, can be employed with less danger of snuffing.

According to the invention described in the latter of said earlier applications, the spacing between nozzles of a single group, the mutual divergence of the nozzles of each group, the spacing of the glass sheet from the frame and the spacing between adjacent groups are all so chosen that the adjacent edges of the air stream issuing from the passageways of the same group overlap and reinforce one another at their edges, while the spacing between neighbouring air streams of adjacent groups by the time such streams reach the glass surface is small or substantially zero (as is desirable to ensure uniform coverage of the glass surface), this spacing between neighbouring air streams of adjacent groups of jets increasing with increasing distance from the glass surface to provide opportunity for flow of spent air in the reverse direction away from the glass.

It is an object of the present invention to provide still further improvement in this bunching feature, and in accordance with one aspect of the invention to provide for the bunching of passageways into groups consisting of three mutually divergent passageways disposed in a triangular array.

Preferably the nozzle members in which the air passageways are formed are mounted on a plurality of air pipes spaced apart and extending parallel with one another. If the passageways are arranged in a series of triangular arrays disposed along each pipe, the effect can be produced of three mutually parallel rows extending along the pipe with the passageways of each row in staggered relation to the passageways of an adjacent row and with the longitudinal axes of all the passageways of a selected row lying in a common plane. If then, the three planes so defined are made mutually divergent in the direction away from the pipe and towards the glass sheet, it is practical to arrange by having regard to the degree of such divergence, the spacing between the passageways constituting each row, and the spacing between rows, that the spacing between pipes will be large (which is highly desirable as allowing increased facilities for escape of spent air) while the air streams issuing from the passageways will still impinge on the surface of the glass in a substantially uniformly distributed pattern, even in the areas between pipes. This can be accomplished without diminishing the overlap and mutual reinforcement of adjacent edges of the air streams issuing from the passageways of a selected pipe so as to enhance the "throw" of the frame.

Another aspect of the present invention is the provision of improvements in respect of apparatus employed for tempering sharply bent glass. In many glass tempering machines it is arranged for each of the blowing frames to be subjected to a rotary oscillation or orbital movement so that the local area of the sheet receiving each jet of air is continuously varying as the frames move. The diameter of the orbits in which each nozzle moves has generally been of the order of 2½ to 4 inches, which is of a similar order of magnitude to the spacing between adjacent nozzles. The orbital oscillation enables the air to be played over the entire surface of the glass, with a slight effective overlap on the glass, without requiring overlap between adjacent air streams. For example, in a typical installation, a nozzle spacing of 2" has been used in combination with a 2¾" diameter of orbit.

Orbital oscillation thus provides a solution to the problem presented by the need for wide nozzle spacing (to avoid snuffing) parallel with the need for adequate coverage by the air streams of the entire glass surface, but it does introduce certain disadvantages, particularly mechanical complexity. Oscillation was not a serious problem, however, while glass shapes remained comparatively flat, but now that sharply bent tempered safety glass has become commonplace for the rear windows of automobiles, difficulty has begun to be experienced in glass tempering machines. It will be apparent that, with the various portions of the glass that lie in different planes having substantial relative inclination, oscillation in a single plane, while satisfactory for some of the jets, will inevitably be unsatisfactory for others, having the effect of moving the jets more towards and away from the glass than in a plane parallel with the glass surface. The required "throw" of the air streams is consequently varied continuously and inadequate lateral coverage of the glass surface is obtained. These undesirable effects become less and less pronounced the more the diameter of oscillation can be reduced, and the ideal situation is the complete avoidance of any need for oscillation.

It is one of the further objects of the present invention to provide improvement in this regard, i.e. the provision of a blowing frame structure that will produce a satisfactory coverage of the glass surfaces without introducing serious snuffing, but with a small diameter of oscillation in comparison with prior frames and preferably with no oscillation at all. This object of the invention may be expressed as a requirement for the provision of a method by which oscillation can be dispensed with, or minimized, without significant loss of quality in the finished product.

To be able to dispense with oscillation is obviously a desirable aim, if for no other reason than to eliminate the moving parts involved and simplify the apparatus. But more important than this are the aforementioned difficulties that oscillation introduces when the glass shape is complicated. Attempts have been made to provide compound oscillatory motions for frames used in tempering complex bent glass parts, and although these attempts have been technically successful, the frames so made are subject to high initial cost and high maintenance in service. The possibility of being able to reduce or dispense completely with oscillation is very attractive to a manufacturer of tempered safety glass.

Nevertheless, although satisfactory tempered glass has been manufactured with the blowing frame maintained stationary, there is always some danger that a particular mould shape will produce undesirable shielding of the cooling air from the glass sheet. To oscillate, thus represents a factor of safety. On the other hand it introduces the disadvantages described above, the chief of which is the resulting movement of the air nozzles periodically towards and away from the glass at its sharply bent-up ends. Ideally, the nozzles should move substantially parallel to the glass surface, but this is impossible with orbital oscillation, when the various portions of the glass lie in relatively inclined planes; and it becomes a more serious problem as the degree of such relative inclination increases.

A further object of the present invention is thus to provide a method and apparatus for minimising the deleterious effects of oscillation in the operation of glass tempering apparatus designed for the handling of glass sheets bent to the shape now most commonly required by the automobile industry. Specifically, such shape is elongated, being sufficiently long to extend across the full width of the automobile, and terminates at each of its longitudinal ends in an end portion that is bent around at a substantial angle (sometimes even as much as 90°) to the general plane of the intermediate portion lying between the ends. In reality, this intermediate portion will also normally be longitudinally curved, and sometimes will also be transversely curved to produce a compound bend, but such curvature or curvatures will, in general, tend to be less pronounced than the longitudinal curvature of the ends, so that the intermediate portion can be considered as lying approximately within a "mean" plane, that is a plane passing generally through the centre of the intermediate portion while being parallel to a plane tangential to such portion midway between its two ends. To assume this approximation has little effect on the performance of a blowing frame that is blowing air onto the intermediate portion while being oscillated in a plane parallel to such mean plane. Unfortunately, the effect on the bent-up ends cannot be so readily disregarded.

This latter object of the invention may thus be expressed as the provision of a method and structure by which the main advantages of oscillation (avoidance of shielding and increased coverage of the glass surface) can be retained without the attendant disadvantage just mentioned in respect of the bent-up ends of the glass sheet. This object is achieved by employing a linear or near linear oscillation in the direction transverse to the longitudinal extent of the glass.

According to another feature of the invention, such linear oscillation may be conveniently employed in combination with an arrangement of passageways so directed and disposed along each air supply pipe as to direct air onto the glass sheet in a pattern defined generally between a pair of equidistant sinusoidal lines extending in a mean direction parallel to the longitudinal axis of the pipe, the oscillation of the blowing frame relative to the glass supporting means being in a direction parallel to the longitudinal axes of the pipes.

Various manners in which the present invention may be carried into practice are illustrated diagrammatically and by way of example in the accompanying drawings. In these drawings:

FIGURE 3 is a central lateral section taken on the line III—III in FIGURE 2;

FIGURE 4 is an upward continuation of FIGURE 3;

FIGURE 5 is a diagrammatic fragment of FIGURE 1;

FIGURE 7 is an enlarged fragmentary view of a portion of an air pipe of the blowing frames of FIGURES 1 to 4;

FIGURE 8 is a side view of the portion of air pipe seen in FIGURE 7;

FIGURE 9 is a section on the line IX—IX in FIGURE 7;

FIGURE 10 is a section on the line X—X in FIGURE 7;

FIGURE 13 is a cross-sectional view of a pair of adjacent air pipes of this apparatus (taken on line XIII—XIII in FIGURE 14) showing diagrammatically the air streams that issue therefrom and the relationship of these pipes to one another and the glass surface;

FIGURE 14 is a view of the right hand pipe seen in FIGURE 13 as viewed from the right of such figure;

FIGURE 15 is a diagrammatic view illustrating the theoretical pattern of impingement of air streams on a glass surface;

FIGURE 16 is an alternative such pattern;

Figure 18:
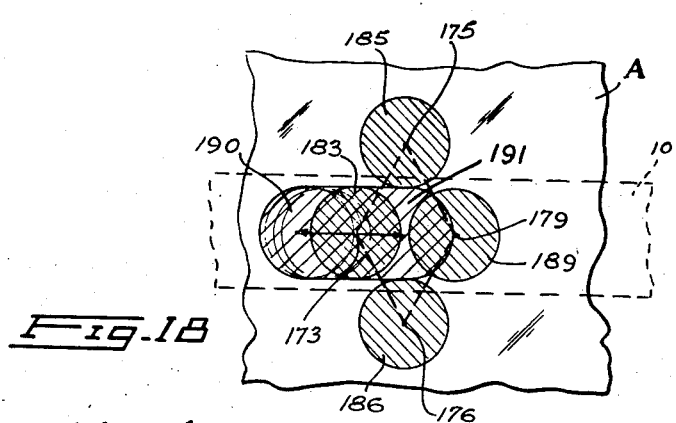
Figure 19:
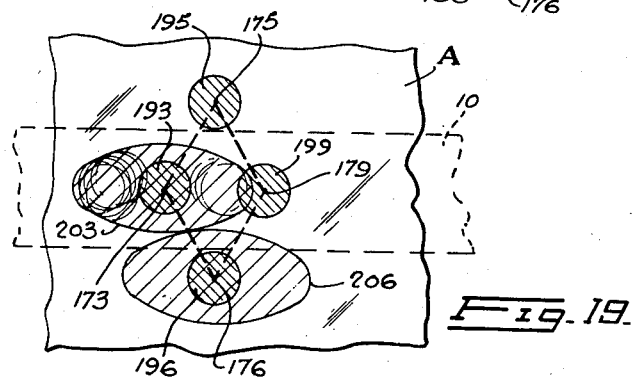
Figure 20:
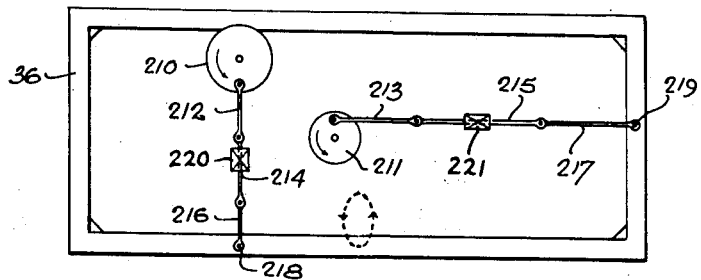
Figure 30:
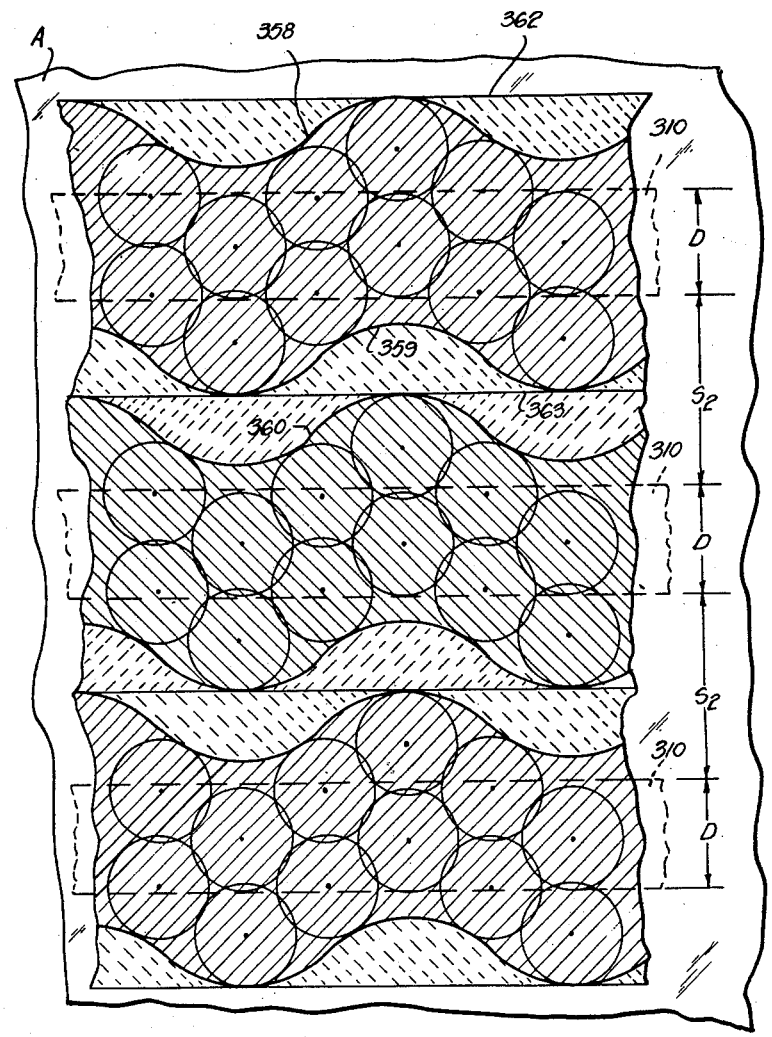
Figure 31:
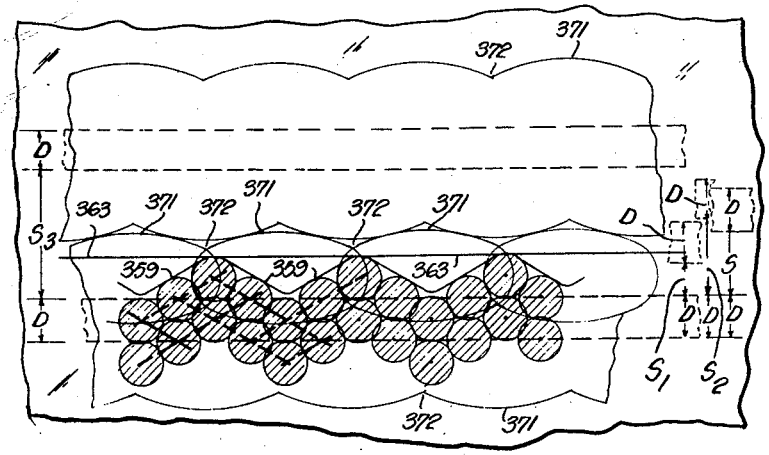
Figure 32:
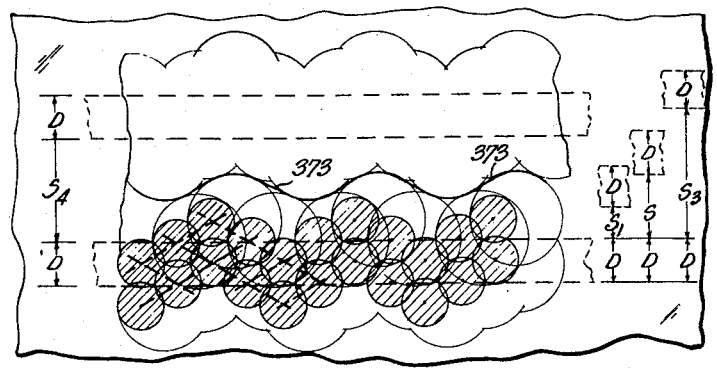
Figures 33, 36:
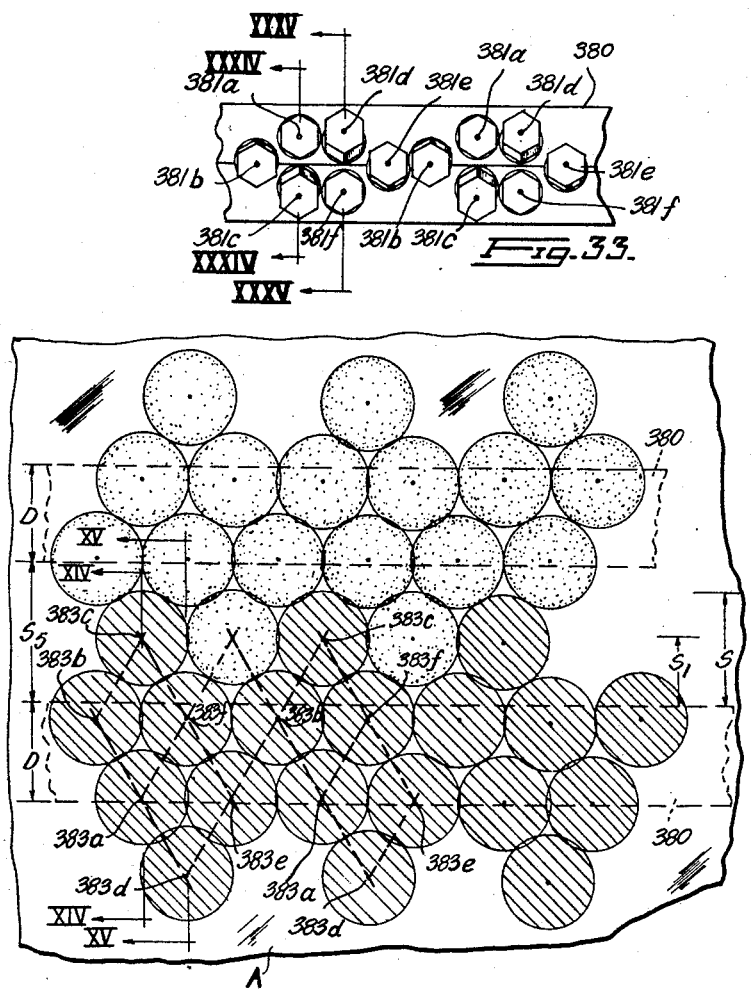

FIGURE 17 demonstrates the effect of oscillation of the frame on the pattern of FIGURE 16;

FIGURE 18 shows a diagram illustrating the coverage obtained on a glass surface using linear oscillation;

FIGURE 19 is a similar diagram illustrating the use of near linear oscillation;

FIGURE 20 demonstrates diagrammatically a form of oscillating apparatus that may be employed;

FIGURE 21 shows a view based on the pattern of FIGURE 15 but modified to demonstrate a possible disadvantage of this pattern;

FIGURE 22 is an enlarged fragmentary plan view of a portion of an air pipe of a blowing frame constructed in accordance with a modification of the present invention;

FIGURE 23 is a side view of the portion of the air pipe seen in FIGURE 22;

FIGURE 24 is a section on the line XXIV—XXIV in FIGURE 23;

FIGURE 25 is a section on the line XXV—XXV in FIGURE 23;

FIGURE 26 is a section on the line XXVI—XXVI in FIGURE 23;

FIGURE 27 is a diagrammatic view illustrating the theoretical pattern of impingement of air jets on a glass surface obtained with a plurality of air pipes as illustrated in FIGURES 22 to 26;

FIGURE 28 is a diagram similar to that of FIGURE 27 demonstrating the conditions prevailing should the center one of the three air pipes there illustrated become misaligned;

FIGURE 29 is a further diagrammatic view demonstrating the effect of linear oscillation of the frame relative to the glass sheet under the conditions illustrated in FIGURE 28;

FIGURE 30 is a further similar diagrammatic view demonstrating the manner in which linear oscillation combined with the particular jet pattern provided by the air pipes shown in FIGURES 22 to 26 permits an increased air pipe spacing;

FIGURE 31 is a diagram demonstrating the effect of elliptical oscillation of the frame relative to the glass sheet under the conditions of FIGURE 30;

FIGURE 32 is a further diagram demonstrating the effect of circular oscillation of the frame relative to the glass sheet under the conditions of FIGURE 30;

FIGURE 33 is a fragmentary plan view of a portion of a still further modified air pipe according to the invention;

FIGURE 34 is a section on the line XXXIV—XXXIV in FIGURE 33;

FIGURE 35 is a section on the line XXXV—XXXV in FIGURE 33; and

FIGURE 36 is a diagrammatic view illustrating the theoretical pattern of impingement of air jets on a glass surface obtained with a plurality of air pipes as illustrated in FIGURES 33 to 35.

Referring firstly to FIGURES 1 to 6, the apparatus will be seen to comprise two blowing frames, the functional essentials of which are two series of spaced parallel air supply pipes 10 arranged to define between the two series a space in which a glass sheet A to be tempered is supported on a glass bending mould M.

Each of the pipes 10 is pivotally mounted at each end in a combination union and socket 11 (see especially FIGURE 6), whereby such pipe is mounted for pivotal movement about its own longitudinal axis and is connected for air supply to feeder pipes 12 and 13 further connected respectively by flexible hoses 14 and 15 to main air supply conduits 16. The feeder pipes 12 and 13 serve also as structural supports for the blowing air pipes 10, these feeder pipes 12 and 13 being slidably mounted in frames 17 and 18 on the respective sides of the glass. Each feeder pipe 13 is provided with a pair of closely spaced collars 19 that serve to confine between them a bracket member 20 which includes a threaded hole engaged by a threaded rod 21 mounted in a respective frame 17 or 18, each rod 21 carrying at one end a bevel gear 22 meshing with a further bevel gear 23 on a spindle 24. A separate spindle 24 is associated with each blowing pipe 10 and extends the full distance across the apparatus so as to move both ends of its associated pipe 10 simultaneously. Each spindle 24 is fitted with flattened end portions 25 suitable for engagement by a hollow key whereby an individual pipe 10 may be moved towards or away from the glass sheet independently of the remaining such pipes.

The frame parts 17 and 18 are secured to air supply conduits 16 which also function as frame members. On each side of the apparatus the four air supply conduits 16 associated with the upper blowing frame (FIGURE 2) are joined together by a common header 26 which in turn is supplied with air by a pair of combination pipe and frame members 27 connected to a further header 28 (FIGURE 3) and an elbow pipe 29. In a similar fashion the air supply conduits 16 associated with the lower blowing frame are supplied at each end through a header 30 and a further pipe 31 which includes an elbow bend so as to extend upwardly to lie adjacent the pipe 29 supplying the upper blowing frame. Pipes 29 and 31 on both sides of the apparatus are joined by flexible hoses 32 to a main air supply header 33 (see FIGURE 4) mounted above the tempering apparatus in fixed frame members 34. Air under pressure is supplied through pipe 35 from a reservoir and compressor installation (not shown).

The pipes 27 and 31 are secured to an oscillating main frame 36 mounted at the rear on ball mountings 37 and at the front on eccentric mountings 38 driven through gearing 38a and shaft 39 from a motor 39a.

The mould M on which the glass A is mounted is supported in a carrier C which consists of a pair of spaced members 100 between which the mould M is slung by means of slotted arms 101 depending from the members 100 and transverse rods 102 secured to the mould and extending into the slots in the arms 101. The central portions of the carrier members 100 are straight and horizontal, but the end portions are bent upwards to conform generally to the shape of the mould when in its curved orientation (after bending of the glass) and thus also to conform to the shape of the space that the two blowing frames define between them, the extreme ends of both the carrier members 100 projecting horizontally outwardly to be joined together to complete a closed frame by transverse members 103. These members 103 lie along a plurality of rollers 104 that extend in two series (one on each side of the apparatus) from a furnace 105 (FIGURE 2) through which the glass will have travelled prior to tempering. Rollers 104 are supported on bearings 106 mounted on horizontal beams 107 which are fixed in relation to the furnace and the floor so that the blowing frames oscillate around them and hence relatively to the glass. Rollers 104 are driven through sprockets 108 by chains 109 by motors (not shown).

The plane of orbital oscillation of the main frame 36 and hence the two blowing frames is horizontal and thus parallel with the central portion of the glass sheet A. It follows that the air pipes 10 playing air onto the bent-up ends of the glass A will move partly towards and away from the glass as well as partly parallel to its surface. The diameter of oscillation is therefore kept to a minimum, for the reasons explained above.

Experimental use of the apparatus described and illustrated herein has shown that sitisfactory tempered glass can be manufactured without running the motor 39a, i.e. without any oscillation at all, when the glass sheet is of comparatively small size. With the larger sizes of glass sheet, oscillation has been found desirable, but entirely satisfactory tempered glass has been manufactured with an oscillation diameter of from one inch to one and a half inches, depending on the complexity of glass shape. With large and extremely sharply bent glass and the consequent large moulds, mould shielding problems may require an oscillation diameter of one and a half inches. This is a significant improvement over the two and three quarter inch diameter oscillation found to be the minimum acceptable with prior art glass tempering apparatus employed in the manufacture of large size glass panels, such as automobile rear windows. The undesirable effects introduced by oscillation are more than directly proportional to the diameter of oscillation, so that to be able approximately to halve the diameter of oscillation, more than halves the undesirable effects that result from oscillation. In fact, at a diameter of about one and a half inches and below many of the oscillation difficulties lose much of their significance, so that, except for the mechanical simplicity that would result from the building of tempering apparatus without provision for oscillation, reduction of the oscillation diameter below one inch is not of great significance. It may even be desirable always to retain some small oscillation to overcome any localized shielding effects that parts of the mould may have on the air project from the lower blowing frame onto the underside of the glass. The necessity for this will depend on the nature and size of the mould as indicated above.

The detailed structure of the air pipes 10, which is principally responsible for the ability of the present apparatus to operate with no oscillation or with an oscillation of small diameter, will now be described with reference to the remaining figures of the drawings.

Each air pipe 10 is provided with a large number of nozzles 40. Details of the arrangement of these nozzles 40 on each pipe 10 and of the shape of the pipe itself are contained in FIGURES 7 to 10. The nozzles 40 which are screwed into one wall of the pipe 10 are in the form of small threaded bolts formed with hexagonal heads and threaded shank portions which engage the pipes. They are arranged along each pipe in three mutually parallel rows, the nozzles of each row being staggered in relation to the nozzles of its adjacent row. Alternatively, the arrangement can be considered as forming a series of triangles or a series of parallelograms as between centre points of adjacent nozzles. Each air supply pipe 10 is generally cylindrical in structure, but this structure is modified along the side facing the glass to form a pair of flat outer surfaces 41 and 42 extending axially along the pipe adjacent each other and defining an angle between them on the outside of the pipe slightly greater than 180°. That is to say these surfaces have the effect of disposing those nozzles, the heads of which lie against the surfaces, in mutually divergent relationship in the direction away from the pipe. At intervals along the pipe a further flat surface 43 is formed between the surfaces 41 and 42 and is such as to define a plane angularly intermediate between the planes of the principal surfaces 41 and 42. In this manner the planes defined by the longitudinal axes of the passageways in the nozzles 40 form three mutually divergent planes in the direction away from the pipe and towards the glass sheet. These planes are shown as X, Y and Z in FIGURES 9 and 10.

Reference may conveniently be made to FIGURES 13 and 14 at this juncture, for a fuller understanding of this effect. FIGURE 13 shows the mutual divergence of a pair of such nozzles 40 in the direction transverse to the two pipes 10 shown in this view. FIGURE 14 demonstrates, on the other hand, the lack of divergence between planes Y and Z in the direction parallel to the longitudinal extent of the pipes 10. It will be noted that the nozzles 40 on adjacent pipes 10 are staggered in the sense that the transverse plane through a single central nozzle 40 of the right hand pipe in FIGURE 13 corresponds to the transverse plane through a pair of divergent nozzles 40 in its adjacent pipe shown on the left of this figure, and, although this is not illustrated, the adjacent pipe on its other side. All the pipes will be arranged alternately in this respect.

Figure 1:
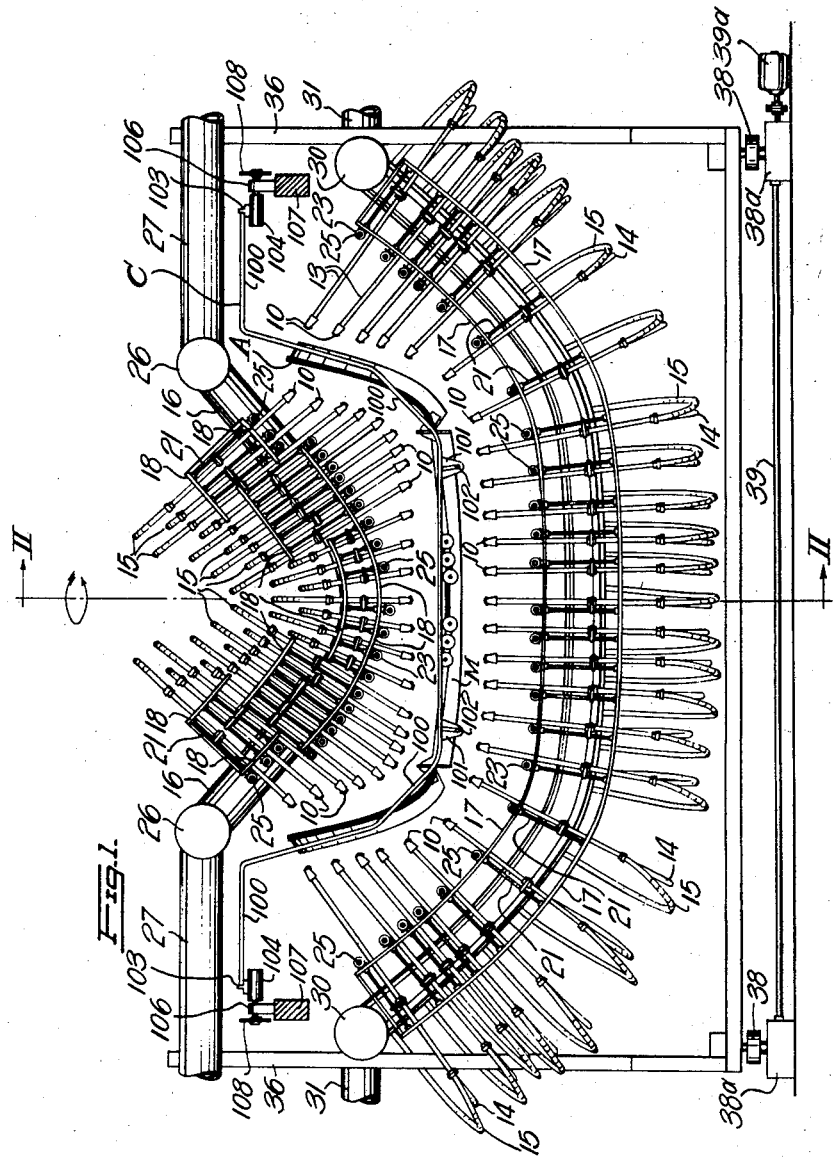
FIGURE 1 shows a front view of the entire apparatus, as seen from the right hand side of FIGURE 2.
Figure 2:
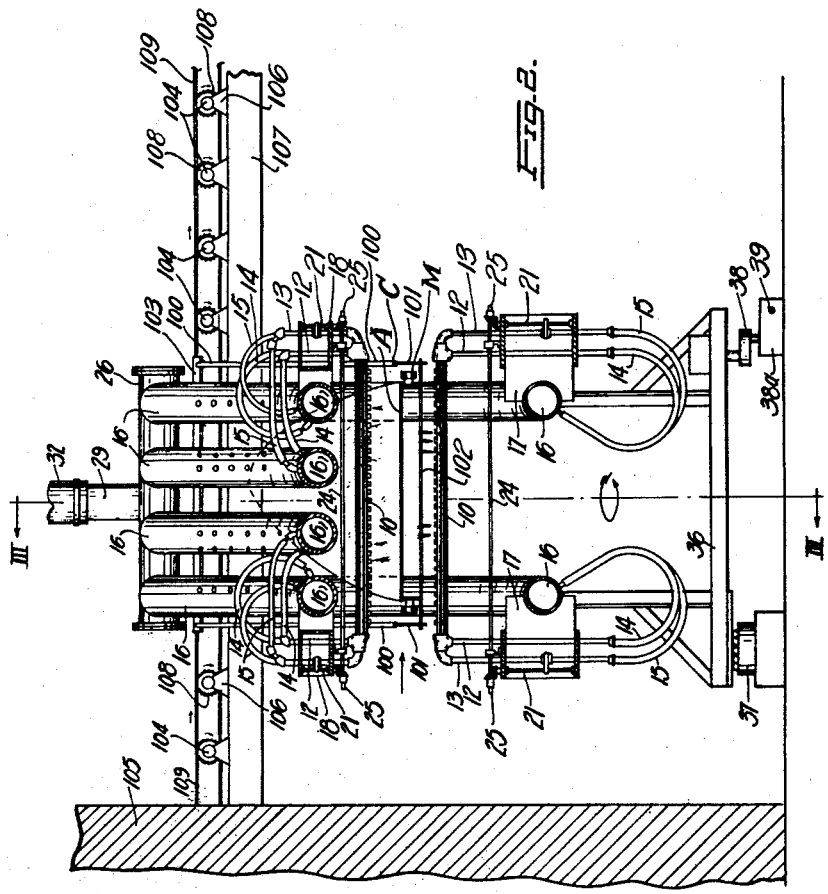
FIGURE 2 is a central transverse section of the apparatus taken on the line II—II in FIGURE 1.
Figure 6:
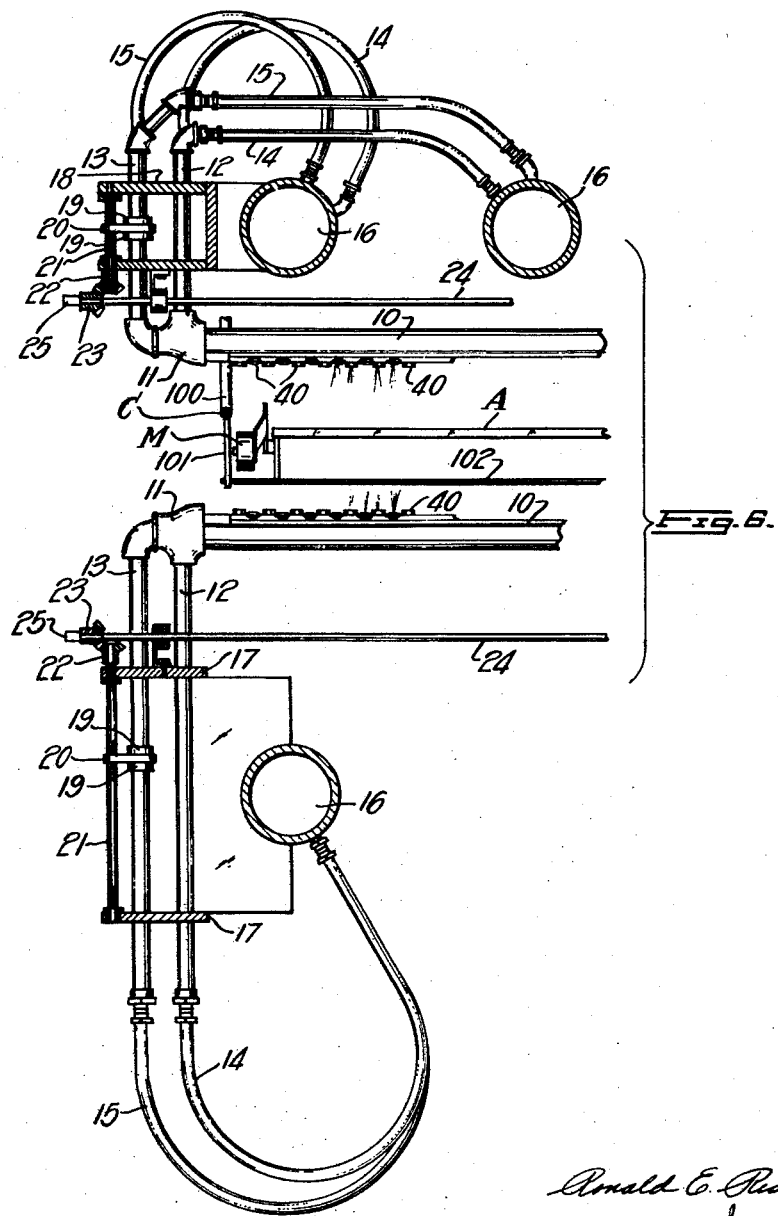
FIGURE 6 is a fragmentary view of a portion of FIGURE 2 shown on an enlarged scale.
Figure 11:
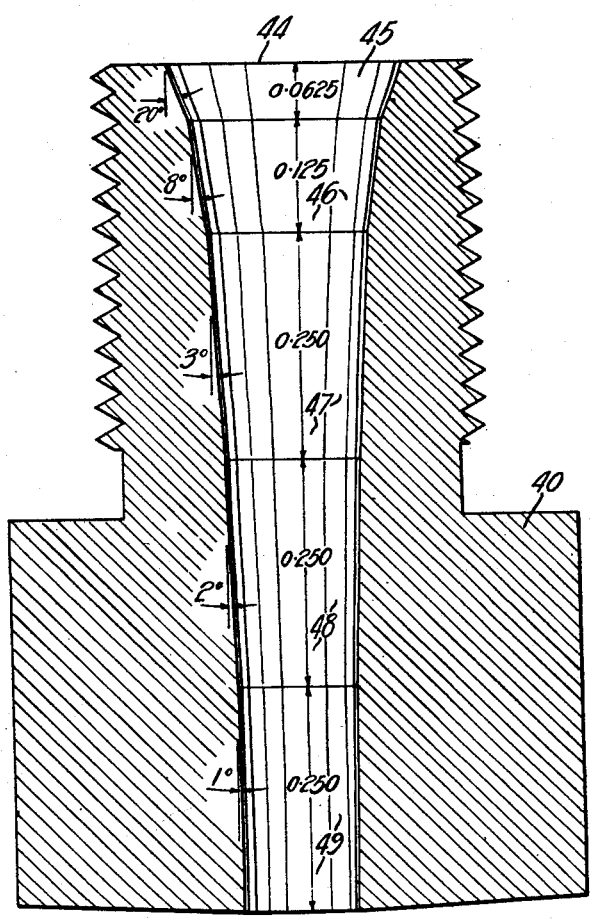
FIGURE 11 is a central section of a typical nozzle used in the air pipe of FIGURES 7 to 10 on a very much enlarged scale.
Figure 12:
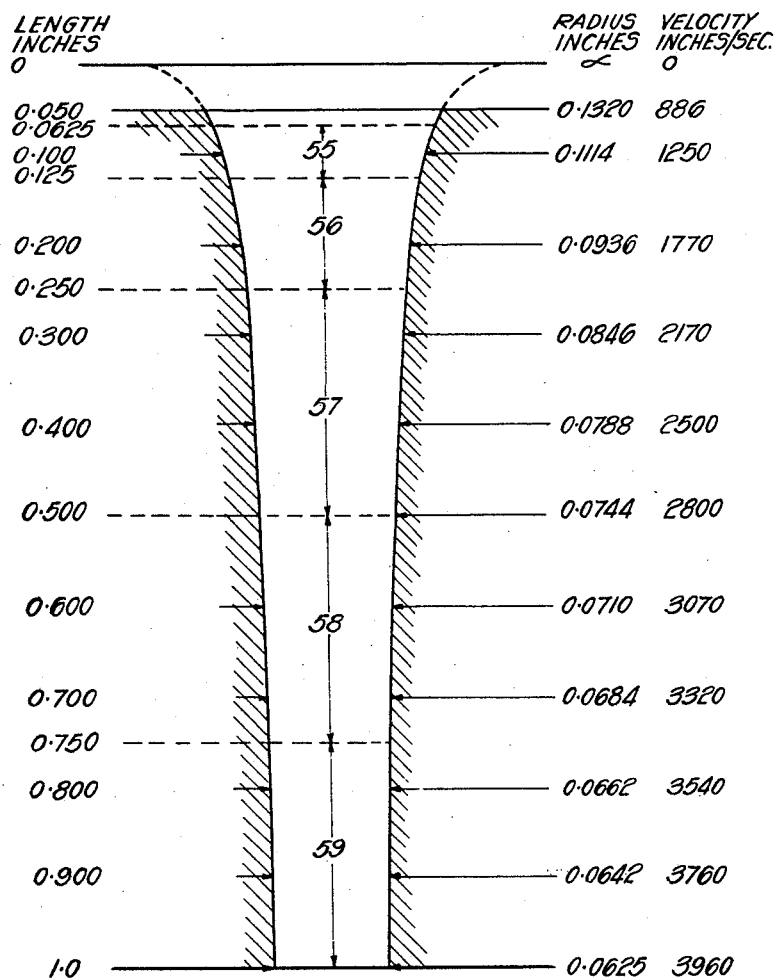
FIGURE 12 is a diagram illustrating the theoretical considerations underlying the design of the nozzle seen in FIGURE 11.

Reference should now be made to FIGURE 11 illustrating the exact shape of the passageway provided in each of the nozzles 40. In the preferred form of the invention, this passageway 44 is formed of at least five conical sections 45, 46, 47, 48 and 49 of successively decreasing taper. A typical semi-angle of taper (i.e. the angle between a wall and the longitudinal axis) for the first section 45 is 20°; for portion 46, 8°, and for subsequent portions 47, 48 and 49; 3°, 2°, and 1° respectively. The purpose of this structure is to obtain a wall shape as nearly as possible conforming to a theoretically developed shape, while still permitting the nozzles to be made with conical drills. Any attempt to drill a truly smoothly curved wall would render the accurate manufacture of these nozzles difficult and expensive, and a large number of them is required. FIGURE 12 is a diagram illustrating a shape that will theoretically, with certain assumptions, provide uniform acceleration to the air passing through the nozzle. Uniform acceleration will result in maximum muzzle velocity, for a given nozzle length, and the figures shown in the right-hand column of FIGURE 12 for air velocity in inches per second indicate the extremely high velocities that can be attained in this way. Length figures are shown on the left-hand side. The figures in the other right-hand column for radius are the theoretically correct figures for uniform acceleration. The radius at zero velocity and zero length is theoretically infinite, and, as a practical matter, the portion of the theoretical curve above the top radius indicated, namely 0.1320 inch has not been accurately plotted. The portion of the theoretical curve above the length dimension of 0.0625 inch has no counterpart in the actual nozzle. Sections 45 to 49 approximately correspond dimensionally to respective areas 55, 56, 57, 58 and 59 in the diagram of FIGURE 12. It will be evident from a comparison of FIGURES 11 and 12 that the passageway 44 constituted by sections 45 to 49 conforms closely with the passageway shown in FIGURE 10 so that the passageway 44 represents a close approximation to the theoretical, the wall angles between the various sections being such that these sections merge one into the other to form an approximation to a continuously curved, inwardly bowed, tapering wall structure.

Returning to FIGURES 13 and 14, diagrammatic representation has been made of the form of air jet that will issue from each of the passageways 44 in the nozzles 40. It is, of course, impossible to illustrate accurately a jet of air, since no clearly defined boundary to the jet will exist. However, these drawings will serve to demonstrate the operation of the nozzles in general terms, the speckled areas 60, 61 and 62 shown in FIGURE 13 representing the general areas of the jets issuing from those nozzles 40 that lie in the plane in which this view is taken, i.e. the plane XIII—XIII shown in FIGURE 14. The area of overlap 63 between jets 60 and 61 is evident in FIGURE 13. This overlap has the effect of each jet assisting and reinforcing the other. A similar and smaller overlap 64 is shown taking place between jets 61 and 62. FIGURE 14 shows a side view comparing the relative positions of jets 62, 65, 66, 67 and 68, all of which originate from the same pipe 10, the right-hand pipe of FIGURE 13. Areas of overlap between adjacent jets 65, 66 and 68 are shown at 69 and 70 and will be seen to be substantial; the overlap between jets 62 and 67 is hidden behind jet 66, but will be similar.

In FIGURE 13, the centre point of each jet, i.e. the axial projection of the longitudinal axis of each of the passageways 44 in planes X, Y and Z is shown as a point 71, 72 or 73 on the glass A. It will be noted that the distance between points 71 and 72 is equal to the distance between points 72 and 73, and the spacing of the nozzles along the pipes 10 is such that the disposition of the centre points defined by the various jets is such as to define a network of equilateral triangular arrays. This triangular arrangement is demonstrated in FIGURE 15 which shows a plan view of a fragment of the glass surface A, with the pipes 10 shown in broken lines to indicate their position above the glass. Points 71, 72 and 73 already mentioned are shown in this figure, the point 73 lying immediately beneath the axis of its associated pipe 10 while the points 71 and 72 lie outwardly therefrom as a result of the outward inclination of the nozzle 40 from which these jets issue. The next nozzle along the upper of the two pipes 10 shown in FIGURE 15 is a centrally situated nozzle and thus gives rise to a jet centre point 74, while the two nozzles on the adjacent pipe 10 in the same plane are divergent so as to produce jet centre points 75 and 76. Similarly the next three jets give rise to centre points 77, 78 and 79 on the glass surface A. It will be evident how these centre points 71 to 79 define a series of equilateral triangles, the pattern continuing as far as the apparatus extends with FIGURE 15 showing only a small fragment thereof. In FIGURE 15 typical areas of coverage of each jet have been illustrated diagrammatically as a circle around each of the centre points, with those from one pipe shown speckled and those from the other shown hatched. It will be noted that substantially complete coverage of the glass surface is obtained. Of course, there will be some flattening out of each jet as it hits the surface, and thus the small uncovered areas shown between the circular jets will not, in effect, be completely unsupplied with cooling air.

Notwithstanding this substantially complete coverage of the surface of the glass by the present arrangement, a comparatively wide area for escape of air is provided between each pair of adjacent pipes 10. As appears from FIGURES 13 and 15, the spacing S between pipes is at least as great as the diameter D of each pipe. The passageway for return of spent air, which air flows in the direction indicated by the arrows 80, is thus substantial, and is of increasing cross-section with increasing distance away from the surface of the glass A.

These considerations assume no oscillation of the frame is necessary. It will however, be essential for this object to be achieved that the spacing of the glass from the pipes and the shape of the nozzles and the air pressure involved and other contributing factors are such as to produce areas of coverage similar to those shown in FIGURE 15 surrounding the centre points 71 to 79. As already explained, it may be preferable, in any given instance, to provide smaller areas of coverage such as shown at 81 to 89 in FIGURE 16, under which circumstances some oscillation of the frame will be essential, and FIGURE 17 shows the type of dynamic pattern obtained on the glass by oscillation of a frame providing static patterns similar to those shown between 81 and 89 in FIGURE 16. Each of these dynamic patterns is in the form of an annulus 91 to 99, respectively (FIGURE 17). Again, the assumption is made that the plane of oscillation is parallel to the plane of the glass. As these are inclined, the dynamic patterns become elliptical instead of circular and a not quite so satisfactory theoretical coverage is obtained. However, in practice, it is found that this departure from theory can readily be tolerated, provided the diameter of oscillation is kept small, i.e. about one and a half inches or less, which the present construction permits.

All the above considerations make the assumption, as they must if useable results are to be obtained, that the area of glass under treatment is flat. This assumption is now, however, valid over the entire glass surface and some modification to the spacing and arrangement of the air pipes 10 is necessary in practice where the glass is curved sharply. This is evident from FIGURES 1 and 2, and from a separate simplified diagram (FIGURE 5) that has been provided to illustrate this aspect of the apparatus. This diagram shows the upper and lower series of air pipes 10 arranged to be all equidistant from a surface of the glass A. It has been found that the best practical approximation to the theoretically calculated pipe spacing (as previously demonstrated in connection with FIGURE 13) is obtained, if each of the pipes 10 is so translated (by movement of its associated spindle 24) and so rotated (by manual adjustment within the sockets 11) that the lines of intersection of the adjacent glass surface and the Y planes (the planes defined by the axes of the centre rows of nozzles) of the air pipes 10 are equally spaced from one another on the glass surface. FIGURE 5 shows such lines L1, L2, L3 etc. to L25 on the upper surface of the glass A, and similar lines L26, L27, L28 etc. to L50 on the lower surface. The distance from line L1 to L2 is equal to the distance between lines L2 and L3 and so on. This will inevitably result in some crowding of the pipes 10 above the sharp bends in the glass, but it has been found in practice that, by reason of the much improved general pipe spacing afforded by the present pipe construction, this crowding can be tolerated without danger of snuffing.

FIGURE 18 is similar to a part of FIGURE 15 in that it shows a pipe 10 in broken lines, the nozzles in this pipe throwing onto the glass surface A a series of air jets having respective centre points 173, 175, 176 and 179 similarly spaced apart in equilateral triangles as the points 73, 75, 76 and 79 of FIGURE 15. It will be noted, however, that, although these centre points are spaced the same distance apart from one another as in FIGURE 15, it has been possible to make the diameters of the effective static areas of coverage 183, 185, 186 and 189 surrounding each such centre point smaller than in FIGURE 15. This represents a substantial economy of air. With linear oscillation of the frame in the direction of extent of the pipes 10, each area of coverage is extended into an elongated shape. For ease of illustration only area 183 has been shown so extended to include areas 190 and 191, but it will be appreciated that all the static areas will in fact be similarly and simultaneously extended to overlap one another.

A still further reduction in the necessary static area of coverage of each jet can be achieved if a "near" linear oscillation is employed. This is illustrated in FIGURE 19 and comprises a pair of mutually transverse linear oscillations of different amplitudes producing a resultant elliptical oscillation. Centre points 173, 175, 176 and 179 are spaced and arranged as before, but again a reduction has been made in the respective static areas of coverage 193, 195, 196 and 199. Extended areas 203 and 206 demonstrate the total coverage obtained with an elliptical oscillation having a ratio of major to minor axes of approximately 2 to 1. As this ratio is decreased and true circular orbital oscillation is approached, the conditions of FIGURES 16 and 17 more nearly prevail. Little or no further reduction in the static areas of coverage is possible with ratios smaller than about 2 to 1, but the degree of oscillatory movement in the direction longitudinal of the glass becomes larger, with the attendant disadvantages mentioned above. An elliptical oscillation will thus be seen to combine the advantages of a substantial movement in the transverse direction of the glass (say 2″) with a small movement in the longitudinal direction (say 1″), while also necessitating only a comparatively small static area of coverage which represents an economy of air.

FIGURE 20 demonstrates diagrammatically how such a compound oscillation may be achieved. The main frame 36 is acted upon by two eccentric mountings 210 and 211 acting through respective articulated connecting rods 212, 213, 214, 215, 216 and 217 on pins 218 and 219 extending through frame 36. Rods 214 and 215 slide in fixed bearings 220 and 221. The ratio of the effective crank arms of eccentrics 210 and 211 determines the flatness of the elliptical oscillation produced. This assumes however that the two eccentrics are rotated at the same speed with a 90° phase angle between them as they are shown in FIGURE 20. If the relative frequencies and/or phase angles are varied, a large number of complex oscillatory paths can be traced out, any one of which may have advantage in a particular instant. To include such alternatives, the term "near linear" has been adopted in preference to "elliptical" to refer generally to all complex oscillations in which the amplitude of oscillation in one direction is significantly greater than in the other direction.

When only linear oscillation is required, the eccentric 211 can be held still, or preferably the eccentric 211 will be dispensed with and the frame 36 mounted to slide transversely on rails.

Reference will now be made to FIGURE 21. This figure shows a jet pattern corresponding generally to that of FIGURE 15. The upper pipe 10 is shown as producing areas of coverage on the glass A, each such area surrounding one of the center points 71, 72, 73, 74, 75, 76, 77, 78, 79, 71a, 72a, 74a, 77a and 78a, FIGURE 21 having been extended downwardly to illustrate three parallel air pipes 10 instead of the two pipes shown in FIGURE 15. To serve as a demonstration of the advantages of the present modification, it has been assumed that the central one of the three pipes 10 shown in FIGURE 21 has become somewhat misaligned (that is rotated about its own axis from its proper orientation), with the result that the entire portion of the jet pattern emanating from such central pipe is displaced downwardly, the static areas of coverage surrounding the center point 76 and the center points on each side of it substantially overlapping the static areas of coverage surrounding center points 71a and 77a. By the same token, the static areas of coverage surrounding center point 75 and the center points to each side of it have been displaced away from the static areas of coverage surrounding center points 72 and 78, with the result that a substantial gap G exists between the portion of the jet pattern provided by the uppermost air pipe 10 and that portion of the pattern provided by the misaligned central air pipe 10.

This figure has been provided to illustrate how such a gap can arise. Needless to say it is detrimental to the proper tempering of the glass. Moreover, FIGURE 21 has been prepared on the same assumption as FIGURE 15, namely that no orbital oscillation of the frame relative to the glass takes place. Even if the static areas of coverage were reduced, and oscillation were employed, in the manner of FIGURES 16 and 17, a similar gap would result from any misalignment of one of the pipes. To prevent any misalignment producing a gap when using the pattern disclosed in such prior application, it would be necessary to adopt both orbital oscillation and a large static area of coverage, an expedient which would be wasteful of air and entirely unnecessary in those parts of the apparatus where the air pipes are correctly aligned—normally the vast majority of the frame area. In fact, to do this might well prove harmful as requiring the projection of too much air towards the glass, thus encouraging the condition known as snuffing. Snuffing is a failure of the warm air to escape from the surface of the glass after it has performed its cooling function.

It will be appreciated that the misalignment of the pipe presumed to have taken place in FIGURE 21 is not a physical translation in any direction, but a mere misalignment about its own longitudinal axis. All the pipes are preferably mounted to be rotatable about their own longitudinal axes, as is described above, because such a manner of mounting affords a great advantage in permitting ready adjustability and rapid adaption of apparatus to a different glass contour without major structural modification of the equipment. Such advantage of flexibility brings with it, however, the greater likelihood that an air pipe will either be slightly misaligned during the setting up of the equipment, or will become misaligned in service, especially if the blowing frame is subjected to the mechanical rigors of oscillation.

One of the purposes of the present modification is to provide a jet pattern which is especially suitable for providing relief in respect of this difficulty.

A first manner in which this end can be achieved will now be described, initially with respect to FIGURES 22 to 26 which illustrate the construction of an air supply pipe which, together with similar such pipes, will yield a jet pattern particularly advantageous in respect of the difficulty above discussed, and then in relation to FIGURES 27 to 30 which illustrate the jet patterns obtained using a plurality of air pipes as illustrated in FIGURES 22 to 26.

FIGURES 22 to 26 show an air pipe 310 provided with a number of nozzles 340a to f. These nozzles are in the form of small threaded bolts formed with hexagonal heads and threaded shank portions which engage the pipe 310. The nozzles are arranged along the pipe in groups, a pair of nozzles to each group, the groups being spaced from one another along the pipe. The jet pattern desired is produced by the particular inclinations of the various nozzles. A first group of nozzles 340a and 340b shown in FIGURE 24 are both inclined somewhat towards one side of the pipe, although the nozzle 340a on the side to which they are both inclined is inclined at a greater angle than its companion nozzle 340b. In other words, the two nozzles of this group are mutually divergent. Such greater inclined nozzle 340a will produce an air jet having a center line shown by the line N. Nozzle 340b will produce an air jet having a center line O. The plane through the centre of the pipe 310 and normal to the glass surface is indicated at Y. The nozzles of the next group of nozzles 340c and 340d, seen in FIGURE 25, are mutually divergent symmetrically about the plane Y and define jet center lines P and Q. The nozzles of the next group of nozzles 340e and 340f, seen in FIGURE 26, are both inclined towards the opposite side of the pipe 310 to nozzles 340a and 340b, thus defining jet center lines R and T and are similarly mutually divergent. The series is cyclic, the next group of nozzles being nozzles 340c and 340d similarly inclined to those seen in FIGURE 25. The groups made up of nozzles 340a and 340b thus form a first set of groups, the mean directions of air flow of which define a first plane V that diverges from one side of the normal plane Y. The groups made up of nozzles 340e and 340f form a second set of groups, the mean directions of air flow of which define a second plane W that diverges from the other side of the normal plane Y. The groups made up of nozzles 340c and 340d make a third set of groups, the mean directions of air flow of which define a third plane lying intermediate the planes V and W, in this instance the normal plane Y. The groups of the first and second sets are arranged along the pipe alternately, and those of the third set are arranged alternately with the groups of the first and second sets combined.

The theoretical impingement pattern produced by air jets issuing from three parallel spaced pipes 310 on a glass sheet A is shown in FIGURE 27. The center points of the jets issuing from the upper of the three pipes 310 are shown at 341a, 341b, 341c, 341d, 341e, and 341f, the letter designation of each of these points corresponding with that of its generating nozzle. Each of these points is at the center of a static area of coverage shown as a circle around the respective center point, for example, the area 342c shown around point 341c. The generally sinusoidal nature of the jet pattern produced by the nozzles of the upper pipe 310 will be apparent from FIGURE 27, and the next adjacent pipe 310, which produces a similar sinusoidal jet pattern, is arranged with its nozzles in register with corresponding ones of the upper air pipe so that the jet patterns of the two pipes nest one within the other. It has not been deemed necessary to apply separate reference numerals to all the center points and static areas of coverage of the other two pipes. To facilitate understanding of the separate jet patterns the areas of coverage have been differently shaded for the three pipes.

The broken lines joining center points 341a, b, c and d demonstrate that the equilateral triangular relationship between the center points discussed above still remains, although it differs from that shown in FIGURE 21 in that there are now no sides of the triangles parallel to the longitudinal axes of the pipes. Instead, some of the sides are perpendicular to these axes.

FIGURE 27 has been drawn on the assumption that all three of the pipes 310 are properly aligned. FIGURE 28 shows the effect produced if a misalignment of the central pipe similar to that shown in FIGURE 21 is experienced with the jet pattern of FIGURE 27. The pattern produced by the center one of the three pipes 310, of which static areas 354 and 355 are representative, is moved away from the pattern produced by the upper pipe 310, of which areas 356 and 357 are representative. At the same time the lower part of the pattern of the middle pipe overlaps the pattern of the lowermost pipe. Thus, in the same manner as in FIGURE 21, a gap G' between the two patterns is produced on the surface of the glass A. The gap G' differs from the gap G in being generally sinusoidal in form, and this fact leads to the ability to close the gap by linear oscillation of the frame relative to the glass A. No amount of linear oscillation in the transverse direction of the glass (that is in the direction of the longitudinal extent of the pipes) would have had any effect on the gap G shown in FIGURE 21, but, if the jet pattern shown in FIGURE 28 is subjected to such linear oscillation, an effect is produced which is illustrated diagrammatically in FIGURE 29. Here the upper pattern has been shown as producing a static envelope defined approximately between sinusoidal lines 358 and 359, while the central pattern is similarly considered as having a static envelope defined between sinusoidal lines 360 and 361. When the pattern is oscillated linearly, as indicated by the arrows F, the static sinusoidal envelope of the jet pattern becomes a dynamic envelope of rectangular shape defined between lines 362, 363, and 364, the troughs 365, 366, 367, 368, 369 and 370 in the sinusoidal patterns being effectively filled in. Although these areas on the glass as represented by the troughs do not receive air continuously as do those parts within the central portions of each of the sinusoidal envelopes, they will normally receive sufficient air to effect proper tempering of the glass. In preparing FIGURES 28 and 29 it has been assumed that the misalignment is of a magnitude such that gap G' is equal to the depth of the troughs in the sinusoidal pattern. Should the misalignment be greater than this value, a permanent gap will remain. It will be evident, nevertheless, that the jet pattern of FIGURE 27 can tolerate a substantial degree of misalignment without any part of the glass surface A being totally deprived of air.

This advantage has been obtained at some expense to the pipe spacing, however. The pipe spacing S and pipe diameter D shown in FIGURE 21 is the same as in FIGURE 15, and a comparison between the dimension S in FIGURE 21 and the corresponding dimension $S_1$ in FIGURE 27 shows a reduction of about 40%. If this reduced spacing cannot be tolerated, then it may be increased in the manner shown in FIGURE 30 which illustrates three similar pipes 310 spaced apart by distances $S_2$ which is approximately 40% greater than S. With this increased spacing, there is always a gap between the static sinusoidal patterns, but this gap is effectively eliminated by the filling of the troughs as a result of linear oscillation, in the manner already demonstrated in FIGURE 29. There is, however, no longer any tolerance for misalignment. Any misalignment from the arrangement shown in FIGURE 30 would produce a permanent gap.

The user is thus provided with a choice. He has a choice of maximum tolerance for misalignment with comparatively close air pipe spacing (FIGURE 27), increased pipe spacing with no tolerance for misalignment (FIGURE 30), or some intermediate stage with partial tolerance for misalignment and some improvement in air pipe spacing. Whichever choice is made the pattern has one advantage or other over that previously disclosed. It also has the merit of flexibility in that it provides the engineer with a greater area of choice in respect of air pipe spacing and misalignment tolerance than he had with the construction of FIGURES 1 to 16.

When the greater spacing shown in FIGURE 30 is employed, it is no longer necessary to have the static patterns aligned, since they no longer nest one within the other. Any one of the patterns may be displaced longitudinally relative to its neighbour without effecting the overall dynamic pattern obtained.

It will be apparent that the pattern which forms the subject of FIGURES 22 to 26 may be employed in a blowing frame which is mounted for "near linear" oscillation, instead of the linear oscillation so far discussed. The effect will be to combine the advantages of near linear oscillation with a sinusoidal static pattern, and to provide either still further misalignment tolerance or additional improvement in air pipe spacing.

The effect of adopting an elliptical "near linear" oscillation of the pattern of FIGURE 27 is illustrated in FIGURE 31 which shows a comparison between the static envelope line 359, the dynamic envelope line 363 obtained with linear oscillation and the dynamic envelope line 371 obtained using an elliptical oscillation having a major to minor axis ratio of 2 to 1. The elliptical oscillation envelope 371 will be seen to project substantially further from the static envelope 359 than the linear oscillation envelope 363, although it exhibits some shallow depressions 372. By arranging these depressions out of register with the corresponding depressions formed in the dynamic envelope line of each adjacent air pipe, a further substantial increase in pipe spacing to a value of $S_3$ can clearly be obtained, or conversely a greater misalignment tolerance can be achieved, as already explained. The values of S, $S_1$ and $S_2$ drawn to the same scale are shown on the right of FIG. 31 for comparison. These advantages have been obtained at the expense of elliptical oscillation only. The disadvantages of elliptical oscillation are comparatively slight in comparison with those of circular oscillation. FIGURE 32 shows the dynamic envelope line 373 obtained with circular orbital oscillation. It permits only a pipe spacing of $S_4$ which is slightly worse than the spacing $S_3$ obtained with elliptical oscillation. Consequently, elliptical oscillation is preferred to circular oscillation.

FIGURES 33, 34 and 35 are front and sectional views of a still further modified air pipe 380 according to the invention, and FIGURE 36 shows the static air pattern obtained on the glass with a pair of pipes as shown in FIGURE 33. FIGURE 33 shows the disposition of nozzles employed. The nozzles are arranged triangularly in groups placed back to back. A first group is composed of nozzles 381a, 381b and 381c producing air jets mutually divergent each from one another, the group as a whole being inclined to one side of the pipe to give rise to jet centre lines 382a, 382b and 382c, respectively, and jet centre points 383a, 383b and 383c on the glass A (FIGURE 36). The nozzles of the next group 381d, 381e and 381f are similarly mutually divergent, while being inclined as a group to the opposite side of the pipe to produce jet centre lines 382d, 382e and 382f and jet centre points 383d, 383e and 383f on the glass. The pattern then repeats with another group of nozzles 381a, 381b and 381c, followed by another group of nozzles 381d, 381e and 381f and so on.

Thus, in this latter modified form, only two sets of groups are employed, those directed to one side of the normal plane and those directed to the other side. The third set of intermediate groups is not required.

The pattern produced is a return to some extent to the pattern of FIGURE 21, in that the equilateral triangles are arranged with sides parallel to the longitudinal axes of the pipe, in contrast to FIG. 27. On the other hand, it embodies the sinusoidal feature of the pattern of FIG. 27 and has the advantages of the sinusoidal shape without the disadvantage of the pattern of FIGURE 27 that the spacing between pipes is reduced from S to $S_1$. The spacing between the pipes in FIGURE 36 will be seen to be $S_5$, which is greater than $S_1$ and even greater than S (shown on the same scale on the right-hand side of FIG. 36), without loss of misalignment tolerance.

I claim:

1. Glass tempering apparatus comprising a blowing frame and means for supporting a glass sheet adjacent said frame, said frame comprising a plurality of parallel, spaced air supply pipes, each pipe having a plurality of groups of passageways extending through a wall thereof, each group comprising a plurality of mutually discrete passageways, the passageways of each group being mutually divergent from one another, the arrangement of said passageways on said pipes and the spacing between said pipes being so chosen in relation to the position occupied by the glass sheet that the points of intersection of the centre lines of said passageways with the adjacent surface of said glass sheet define a pattern on said surface in which every pair of adjacent said points forms with two further said points a pair of equilateral triangles.

2. Glass tempering apparatus comprising a blowing frame and means for supporting a glass sheet adjacent said frame, said frame comprising a plurality of parallel, spaced air supply pipes, each pipe having a plurality of mutually discrete passageways extending through a wall thereof with the centre lines of said passageways defining a plurality of mutually divergent planes parallel to the longitudinal axis of said pipe, the degree of such divergence and the spacing between said pipes being so chosen in relation to the position occupied by the glass sheet that points of intersection of the centre lines of said passageways with the adjacent surface of said glass sheet define a pattern on said surface in which every pair of adjacent said points forms with two further said points a pair of equilateral triangles, the spacing between said pipes and the divergence of said passageways being further such as to provide increasing cross section between the edges of airstreams of adjacent pipes with increasing distance from said surface of the glass sheet.

3. Glass tempering apparatus comprising a blowing frame and means for supporting a glass sheet adjacent said frame, said frame comprising a plurality of parallel, spaced air supply pipes, each pipe having a plurality of mutually discrete passageways, said passageways having longitudinal axes and extending through a wall of said pipe with said passageways arranged in three parallel rows extending along said pipe with the passageways of each row arranged in staggered relation to the passageways of an adjacent row and with the longitudinal axes of the passageways of each row lying in a common plane, the three planes so defined being mutually divergent in the direction away from the pipe and toward the glass sheet, the degree of such divergence, the spacing between the passageways of each row, the spacing between rows, and the spacing between pipes being so chosen in relation to the position occupied by the glass sheet, that airstreams issuing from such passageways impinge on the surface of the glass sheet in a pattern substantially uniformly distributed over said surface while providing areas of increasing cross-section between edges of airstreams of adjacent pipes with increasing distance from the surface of the glass sheet.

4. Glass tempering apparatus comprising a blowing frame and means for supporting a glass sheet adjacent said frame, said frame comprising a plurality of parallel, spaced air supply pipes, each pipe having a plurality of mutually discrete passageways, said passageways having longitudinal axes and extending through a wall of said pipe, said passageways being arranged in three mutually parallel rows extending along said pipe with the passageways of each row arranged in staggered relation to the passageways of an adjacent row and with the longitudinal axes of the passageways of each row extending parallel to one another and lying in a common plane, the three planes so defined being mutually divergent in the direction away from the pipe and toward the glass sheet, the degree of such divergence, the spacing between the passageways of each row, the spacing between rows, and the spacing between pipes being so chosen in relation to the position occupied by the glass sheets that airstreams issuing from such passageways impinge on the surface of the glass sheet in a pattern substantially uniformly distributed over said surface with adjacent edges of airstreams issuing from the passageways of the same pipe overlapping and reinforcing one another while providing areas of increasing cross-section between edges of airstreams of adjacent pipes with increasing distance from the surface of the glass sheets.

5. A method of tempering a glass sheet comprising causing groups of mutually divergent air jets to impinge on both surfaces of said sheet in patterns substantially uniformly distributed over said surfaces while providing spaces of increasing cross-section between said groups of air jets with increasing distance from the associated said surface to promote the removal of heated air therefrom.

6. A method according to claim 5, wherein the points of intersection of the centre lines of said air jets with the associated glass surface define a pattern on said surface in which every pair of adjacent said points forms with two further said points a pair of equilateral triangles.

7. A method according to claim 5, wherein the spatial position of said air jets in relation to the spatial position of said glass sheet is maintained stationary.

8. A method according to claim 5, including the step of effecting relative orbital oscillation of said air jets relatively to said glass sheet, the diameter of such oscillation being not greater than approximately one and a half inches.

9. A method of tempering an elongated curved glass sheet having an intermediate portion serving generally to define a mean plane and end portions at its longitudinal extremities, said end portions each being sharply inclined to said mean plane, said method comprising causing groups of mutually divergent air jets to impinge on both surfaces of said sheet in patterns substantially uniformly distributed over said surfaces while providing spaces of increasing cross-section between said groups of air jets with increasing distance from the associated said surface to promote the removal of heated air therefrom, and simultaneously effecting orbital oscillation of said air jets relative to said glass sheet in a plane generally parallel to said mean plane, said oscillation having an amplitude in the direction of the transverse extent of said sheet substantially in excess of its amplitude in the direction of the longitudinal extent of said sheet.

10. A method according to claim 9, wherein the ratio of said amplitude in the direction of the transverse extent of the sheet to said amplitude in the longitudinal extent of the sheet is at least as great as approximately 2:1.

11. A method of tempering an elongated curved glass sheet having an intermediate portion serving generally to define a mean plane and end portions at its longitudinal extremities, said end portions each being sharply inclined to said mean plane, said method comprising causing groups of mutually divergent air jets to impinge on both surfaces of said sheet in patterns substantially uniformly distributed over said surfaces while providing spaces of increasing cross-section between said groups of air jets with increasing distance from the associated said surface to promote the removal of heated air therefrom, and simultaneously effecting linear oscillation only of said air jets relative to said glass sheet, said oscillation being in a plane generally parallel to said mean plane and in the direction of the transverse extent of said sheet.

12. Apparatus comprising means for supporting an elongated curved glass sheet having an intermediate portion serving generally to define a mean plane and end portions at its longitudinal extremities, said end portions each being sharply inclined to said mean plane, a pair of opposed blowing frames fixed together and defining between them a cavity conforming generally in longitudinal shape to that of said sheet each of said frames comprising a plurality of parallel, spaced air supply pipes, each pipe having a plurality of mutually discrete passageways extending through a wall thereof with the center lines of said passageways defining a plurality of mutually divergent planes parallel to the longitudinal axis of said pipe, the degree of such divergence and the spacing between said pipes being so chosen in relation to the position occupied by the glass sheet that points of intersection of the center lines of said passageways with the adjacent surface of said glass sheet defines a pattern on said surface in which every pair of adjacent said points forms with two further said points a pair of equilateral triangles, the spacing between said pipes and the divergence of said passageways being further such as to provide increasing cross-section between the edges of airstreams of adjacent pipes with increasing distance from said surface of the glass sheet, means for mounting said supporting means to position said sheet in said cavity, means for effecting orbital oscillation of said frames relative to said supporting means in planes generally parallel to said mean plane, said oscillation having an amplitude in the direction of the transverse extent of said cavity substantially in excess of its amplitude in the direction of the longitudinal extent of said cavity.

13. Apparatus according to claim 12, wherein the ratio of said amplitude in the direction of the transverse extent of said cavity to said amplitude in the direction of the longitudinal extent of said cavity is at least as great as approximately 2:1.

14. Glass tempering apparatus comprising a blowing frame and means for supporting a glass sheet adjacent said frame, said frame comprising a plurality of parallel, mutually spaced air supply pipes, each pipe having a plurality of groups of mutually discrete passageways extending between the interior and exterior thereof, each such group comprising a plurality of passageways, the passageways of each group being mutually divergent from one another in the direction of air flow from the interior to the exterior of the pipe, said passageways being so constructed and arranged along each said pipe as to direct air onto said sheet in a pattern defined generally between a pair of equidistant sinusoidal lines extending in a mean direction parallel to the longitudinal axis of said pipe, and means for effecting oscillation of said frame relative to said supporting means at least in a direction parallel to the longitudinal axes of said pipes.

15. Apparatus according to claim 14 wherein said oscillating means are such as to effect oscillation of said frame relative to said supporting means in a plane generally parallel to said glass sheet, said oscillation having an amplitude in the direction of the longitudinal axes of said pipes substantially in excess of its amplitude in the direction transverse to said axes.

16. Glass tempering apparatus comprising a blowing frame and means for supporting a glass sheet adjacent said frame, said frame comprising a plurality of parallel mutually spaced air supply pipes, each pipe having a plurality of mutually discrete passageways extending through a wall thereof for directing air jets towards the adjacent surface of said glass sheet, said passageways being arranged in groups disposed along each said pipe, each said group comprising a plurality of passageways, the passageways of each group being so constructed and arranged as to be mutually divergent from one another in the direction of flow of said air jets while defining a mean direction of said flow, a first set of said groups being so constructed and arranged that the mean directions of air flow of the groups in said first set define a first plane that diverges from a first side of a plane normal to the glass surface extending through the longitudinal axis of said pipe, a second set of said groups being so constructed and arranged that the mean directions of air flow of the groups in said second set define a second plane that diverges from the other side of said normal plane, the groups of said second set being disposed alternately with the groups of said first set along said pipe, and means for effecting oscillation of said frame relative to said supporting means at least in a direction parallel to the longitudinal axes of said pipes.

17. Apparatus according to claim 16, including a third set of said groups so constructed and arranged that the mean directions of air flow of the groups in said third set define a third plane lying intermediate said first and second planes, the groups of said third set being disposed alternately with the groups of said first and second sets combined.

18. Glass tempering apparatus for blowing tempering fluid at a predetermined pressure against the opposing surfaces of a supported glass sheet, said apparatus comprising a blowing frame and means for supporting a glass sheet at a predetermined distance from said frame, said frame comprising a plurality of parallel pipes, each pipe having a plurality of groups of passageways extending between the interior and exterior thereof, each such group comprising a plurality of mutually discrete passageways, the passageways of each group being mutually divergent from one another in the direction of air flow from the interior to the exterior of the pipe.

19. Glass tempering apparatus comprising a blowing frame and means for supporting a glass sheet adjacent said frame, said frame comprising a plurality of parallel, spaced air supply pipes, a plurality of groups of mutually discrete passageways extending through a wall of each pipe, each group of passageways comprising at least two mutually divergent passageways located along mutually parallel rows extending longitudinally of the pipe, the arrangement of said passageways on said pipes and the spacing between the pipes being so chosen in relation to the position occupied by the glass sheet that airstreams issuing from such passageways impinge on the adjacent surface of the glass sheet in a pattern substantially uniformly distributed over said adjacent surface while providing areas of increasing cross-section between edges of adjacent air streams with increasing distance from the adjacent surface of the glass sheet.

20. Glass tempering apparatus according to claim 19 wherein the arrangement of said passageways on said pipes and the spacing between the pipes is so chosen in relation to the position occupied by the glass sheet that the points of intersection of the axes of the centre lines of said passageways with the surface of the glass sheet are uniformly spaced from one another.

References Cited in the file of this patent

UNITED STATES PATENTS

| | | |
|---|---|---|
| 964,126 | Smith et al. | July 12, 1910 |
| 2,073,208 | Hayward | Mar. 9, 1937 |
| 2,080,083 | Magnien | May 11, 1937 |
| 2,131,406 | Mosmieri et al. | Sept. 27, 1938 |
| 2,137,061 | Quentin | Nov. 15, 1938 |
| 2,263,679 | Ferre | Nov. 25, 1941 |
| 2,411,701 | Weihs | Nov. 26, 1946 |
| 2,790,270 | Freiberg | Apr. 30, 1957 |
| 2,876,592 | Black et al. | Mar. 10, 1959 |
| 2,876,593 | Neuhausen | Mar. 10, 1959 |
| 2,881,565 | White | Apr. 14, 1959 |

FOREIGN PATENTS

| | | |
|---|---|---|
| 781,116 | France | Feb. 18, 1935 |
| 626,078 | Germany | Feb. 20, 1936 |
| 953,053 | France | May 16, 1949 |
| 456,485 | Italy | Sept. 7, 1949 |
| 1,084,256 | France | July 7, 1953 |
| 551,972 | Belgium | Apr. 20, 1957 |